United States Patent
Manzoor (10) Patent No.: US 9,982,746 B2
(45) Date of Patent: May 29, 2018

(54) TWO-PART HUB FOR A TORSIONAL VIBRATION DAMPER AND METHOD OF MAKING SAME

(71) Applicant: Suhale Manzoor, Plymouth, MI (US)

(72) Inventor: Suhale Manzoor, Plymouth, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 56 days.

(21) Appl. No.: 14/815,005

(22) Filed: Jul. 31, 2015

(65) Prior Publication Data

US 2016/0033005 A1   Feb. 4, 2016

Related U.S. Application Data

(60) Provisional application No. 62/032,319, filed on Aug. 1, 2014.

(51) Int. Cl.
*F16F 15/315* (2006.01)
*F16F 15/12* (2006.01)

(52) U.S. Cl.
CPC ................................ *F16F 15/1203* (2013.01)

(58) Field of Classification Search
CPC ....... F16H 2055/366; F16H 2045/0221; F16H 57/0006; F16H 7/0827; F02B 67/06; F16D 3/12; F16D 2300/22; F16F 15/12353; F16F 15/30
See application file for complete search history.

(56) References Cited

U.S. PATENT DOCUMENTS

| 2,723,573 | A |   | 11/1955 | Dillman |
| 4,178,811 | A |   | 12/1979 | Shepherd |
| 4,239,097 | A |   | 12/1980 | Greacen et al. |
| 4,293,136 | A | * | 10/1981 | George ............... F16F 15/1442 277/565 |

(Continued)

FOREIGN PATENT DOCUMENTS

| EP | 0249797 | | 12/1987 |
| EP | 0460292 | A1 | 12/1991 |

OTHER PUBLICATIONS

PCT, International Search Report and Written Opinion, Application No. PCT/US2015/043194 (dated Oct. 23, 2015).

(Continued)

*Primary Examiner* — Long T Tran
(74) *Attorney, Agent, or Firm* — FisherBroyles, LLP; Susan M. Oiler (57) ABSTRACT

Two-part hubs for torsional vibration dampers are disclosed that have a main body made of a softer material than a seal nose and do not require a welded joint to join them together. The main body has a plate defining a front face and a back face, an annular core extending axially outward from the back face of the plate and defining an innermost, outer radial surface and a first bore through the main body, and an outermost, radial, elastomer-receiving surface spaced apart from the innermost outer radial surface by the plate. The seal nose is mated to the innermost, outer radial surface of the annular core and mechanically engaged with the main body for rotation together. Torsional vibration dampers that include the two-part hubs are also disclosed, as well as a front end accessory drive including the same, and methods of manufacturing the two-part hubs.

15 Claims, 5 Drawing Sheets

(56) References Cited

U.S. PATENT DOCUMENTS

| | | | |
|---|---|---|---|
| 4,548,311 A | 10/1985 | Lech, Jr. | |
| 4,677,868 A * | 7/1987 | Filkins | F16D 23/06 |
| | | | 464/24 |
| 6,684,735 B2 | 2/2004 | Watanabe et al. | |
| 6,875,113 B2 * | 4/2005 | Nichols | F16F 15/1442 |
| | | | 464/90 |
| 7,073,474 B2 * | 7/2006 | Biel | F02B 75/06 |
| | | | 123/192.1 |
| 7,197,959 B2 * | 4/2007 | Crissy | F16F 15/126 |
| | | | 464/90 |
| 7,437,808 B2 * | 10/2008 | Hodjat | B22F 8/00 |
| | | | 100/34 |
| 8,517,845 B2 | 8/2013 | Shin | |
| 2005/0050985 A1 * | 3/2005 | Crissy | F16F 15/126 |
| | | | 74/574.4 |
| 2008/0034918 A1 | 2/2008 | Manzoor et al. | |

OTHER PUBLICATIONS

EP, Supplemental Search Report; European Application No. 15826591.8 (Mar. 13, 2018).

\* cited by examiner

TWO-PART HUB FOR A TORSIONAL VIBRATION DAMPER AND METHOD OF MAKING SAME

RELATED APPLICATION

This application claims the benefit of U.S. Provisional Application No. 62/032,319, filed Aug. 1, 2014, which is incorporated herein by reference in its entirety.

FIELD OF THE DISCLOSURE

The present invention relates to torsional vibration dampers for vehicle engines and, more particularly, to a two-part hub for such torsional vibration dampers.

BACKGROUND

A crankshaft drives the front end assembly drive (FEAD) system of an engine. The crankshaft is turned by the firing of pistons, which exerts a rhythmic torque on the crankshaft, rather than being continuous. This constant application and release of torque causes vacillations, which can stress the crankshaft to the point of failure. Stated another way, the crankshaft is like a plain torsion-bar, which has a mass and a torsional spring rate, that causes the crankshaft to have its own torsional resonant frequency. The torque peaks and valleys, plus the inertia load from the acceleration of the reciprocating components, cause the crankshaft itself to deflect (rotationally) forward and backward while it is operating. When those pulses are near the crankshaft resonant frequency, they cause the crank to vibrate uncontrollably and eventually break. Accordingly, a torsional vibration damper (sometimes referred to as a crankshaft damper) is mounted on the crankshaft to solve this problem by counteracting torque to the crank, negating the torque twisting amplitude placed upon the crankshaft by periodic firing impulses, and to transfer rotational motion into the FEAD system, typically by driving an endless power transmission belt.

Torsional vibration damper hubs are expected to be as light, strong, and cost effective as possible. The traditional means of producing a hub in the United States has been through casting the hub with either Nodular or Gray Cast Iron and then machining it to its final shape. However, this method of production has to keep a keen eye of the castability of the material (i.e. filling the mold, and not causing voids etc.) which then leads to a structure that is usually heavier than necessary.

There are other means of production employed elsewhere in the world that yield much lighter and cheaper designs such as stamping and/or forming the hub. However, these methods do not allow for the incorporation of a seal nose because the material used in these processes is soft and does not provide sufficient abrasive/wear resistance needed because of the wear experienced by the seal nose. Some European designs have incorporated a two-piece construction (one of a formed soft steel for the main body of the hub and the other of a hardened or tough steel for the seal nose area) that are welded together to provide axial and angular integrity to the structure. Welding requires specialized capital investment in equipment and is esthetically unappealing, which makes welded two-part hub constructions more difficult to sell in the U.S. market.

SUMMARY

The limitations disclosed in the background section are overcome in the disclosed two-part hub for torsional vibration dampers by eliminating the need for welding the two-part construction together. Nodular Iron (D4512 or equivalent) and Gray Cast Iron (G3500 or equivalent) have been used at the seal nose interface and have proven to have sufficient surface wear toughness to receive an engine seal without causing oil leaks. These tougher, wear resistant irons are used to make a seal nose that is mated, without welding, to a primary hub component that is made of soft(er) steel, in particular, by using a mechanical engagement that allows for both axial and angular integrity of the joint.

In one aspect, two-part hubs are disclosed that include a main body and a seal nose mechanically engaged to one another. The main body has a plate having a front face and a back face, an annular core extending axially outward from the back face of the plate and defining an innermost, outer radial surface and a first bore through the main body, and an outermost, radial, elastomer-receiving surface spaced apart from the innermost outer radial surface by the plate. The seal nose is mated to the innermost, outer radial surface of the annular core and is mechanically engaged with the main body for rotation together without a welded joint. The main body comprises a first material and the seal nose comprises a second material that are different from one another, in particular the first material is softer than the second material, or, stated another way, the second material is more abrasion resistant than the first material. The seal nose has a front face seated in contact with the plate and a shoulder proximate, but spaced a distance apart from, a terminus of the annular core, and the seal nose defines a second bore that, collectively, with the first bore of the annular core defines a crankshaft-receiving bore.

In one embodiment, the innermost, outer radial surface of the main body includes threads, and the seal nose has threads threadingly engaging the threads of the innermost, outer radial surface of the main body. A keyway is formed within at least the first bore of the annular core, which broaches the threads of the seal nose, thereby locking the threads of the annular core and the threads of the seal nose together.

In another embodiment, the seal nose is press-fittingly engaged with the innermost, outer radial surface of the annular core, and one or more pins extend axially into a front face of the seal nose, and connect the seal nose to the main body for rotation together.

In either embodiment, a geometric lock, comprising a hole defined by either or both of the seal nose or the annular core and a pin received in the hole, mechanically engages the main body to the seal nose.

In another aspect, torsional vibration dampers are disclosed that include one of the two-part hubs described herein, an elastomeric damper member disposed in contact with an outermost, radial, elastomeric-receiving surface of the hub, and an inertia member seated against the elastomeric damper member thereby operably coupling the inertia member to the hub for rotation therewith. In one embodiment, the elastomeric member is an annular ring of elastomeric material seated against the outermost, radial elastomer-receiving surface of the main body of the hub, and the inertia member is an annular ring seated against the elastomeric member, both of which are concentric about an axis of rotation of the hub.

In another aspect, any of the torsional vibration dampers disclosed herein may be mounted to the crankshaft as part of a front end accessory drive system.

In another aspect, methods of manufacturing the two-part hub are disclosed. The methods include providing a main body portion comprised of a first material, having a front face and a back face, and having an annular core extending axially outward from the back face and defining a first bore therethrough, providing a seal nose defining a second bore and comprised of a second material that is more abrasive resistant than the first material, mating the seal nose to the annular core of the main body with the first bore and the second bore aligned to collectively define a crankshaft-receiving bore, mechanically engaging the seal nose with the main body for rotation together without a welded joint, and machining the crankshaft-receiving bore to meet selected axial and radial run-outs.

In one embodiment, mating the seal nose to the annular core comprises threading the seal nose to the annular core of the main body, and the method further comprises, subsequently, forming a generally axially-oriented keyway recessed in the crankshaft-receiving bore to a depth that broaches the threads of the seal nose thereby locking threads of the annular core and threads of the seal nose together. In this embodiment, mating the seal nose to the annular core includes threading the seal nose to the annular core until a front face of the seal nose is seated against the plate, and if the seal nose includes a shoulder in the second bore, the shoulder is spaced apart from a back face of the annular core by a distance when the front face of the seal nose is seated against the plate.

The methods may include forming the main body by stamping the first material to include the annular core defining an innermost, outer radial surface of the hub and an outermost, radial elastomer-receiving surface spaced apart from the innermost outer radial surface by a plate, and forming the seal nose by machining it from a piece of abrasion resistant material. In one embodiment, the seal nose comprises nodular iron or grey cast iron, and the main body comprises a low carbon steel.

In another embodiment, in a front face of the seal nose, the seal nose comprises a plurality of axially extending receptacles or a plurality of protruding pins. In this embodiment, mating the seal nose to the annular core includes press-fitting the seal nose to the annular core while aligning the receptacles or protruding pins with openings defined in the plate of the main body. When the seal nose includes the plurality of axially extending receptacles aligned with openings defined in the plate, the method further comprises inserting a pin through each opening in the plate into a receptacle in the seal nose, thereby engaging the seal nose with the main body for rotation together without a welded joint.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 1:
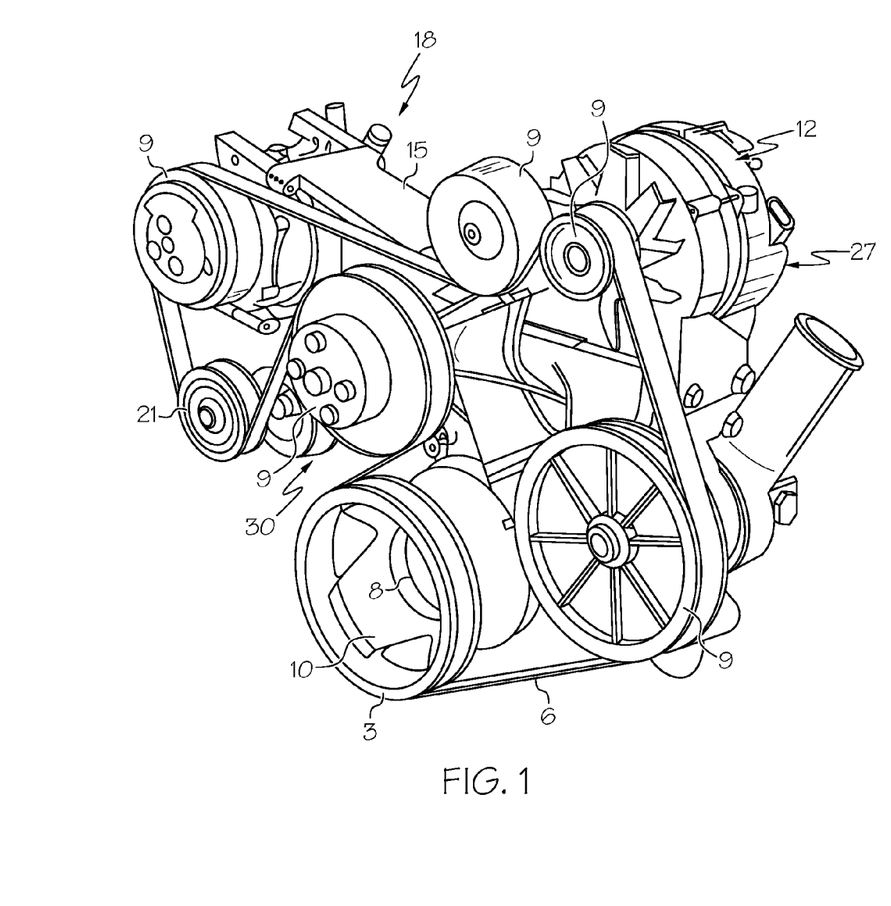
FIG. 1 is a perspective view of components in a front end accessory drive.

Referring now to FIG. 1, an example of one embodiment of a FEAD system 18 is shown, merely for illustration purposes, that includes an integrated housing 15, having a front surface 30 and a rear surface 27. The rear surface 27 of the integrated housing 15 is preferably mounted to an engine. The FEAD system 18 may be utilized with any engine, including vehicle, marine and stationary engines. The shape and configuration of the integrated housing 15 depends upon the vehicle engine to which it is to be mounted. Accordingly, the integrated housing 15 and more specifically the FEAD system 18 may vary along with the location of engine drive accessories 9 and still achieve the objects of the present invention. It should be understood that the location and number of engine drive accessories 9 may be varied. For example, a vacuum pump, a fuel injection pump, an oil pump, a water pump, a power steering pump, an air conditioning pump, and a cam drive are examples of other engine drive accessories 9 that may be mounted on the integrated housing 15, for incorporation into the FEAD system 18. The engine drive accessories 9 are preferably mounted to the integrated housing 15 by bolts or the like at locations along the surface that are tool accessible for easy mounting and also service accessible. In FIG. 1, the integrated housing 15 has a plurality of engine drive accessories 9 including an alternator 12 and a belt tensioner 21.

The engine drive accessories 9 are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12. The belt tensioner 21 automatically adjusts the tension of the endless drive belt 9 to keep it tight during operation and also prevent wear.

Figure 2:
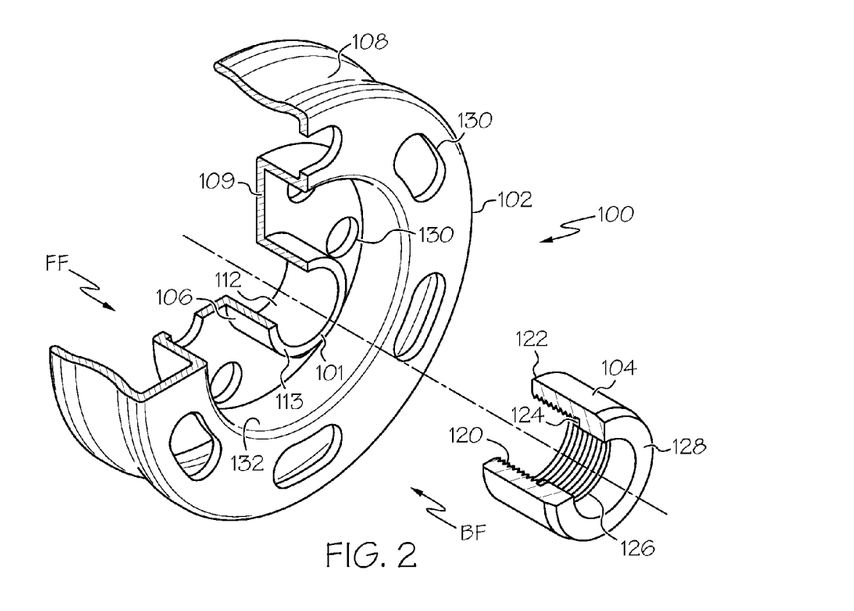
FIG. 2 is a side perspective, partial cut-away view of a two-part hub for a torsional vibration damper at a first stage of manufacture.
Figure 3:
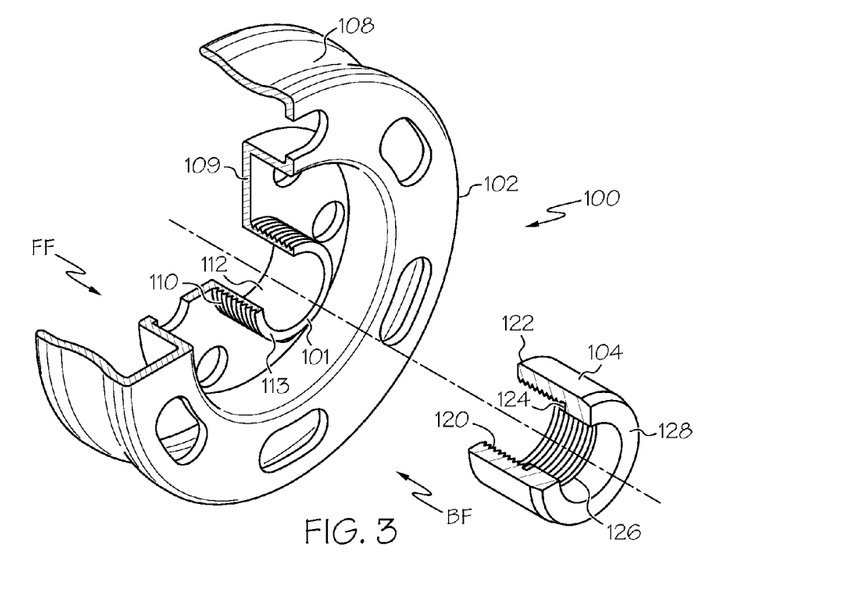
FIG. 3 is a side perspective, partial cut-away view of the two-part hub in FIG. 2 after a second stage of manufacture.
Figure 4:
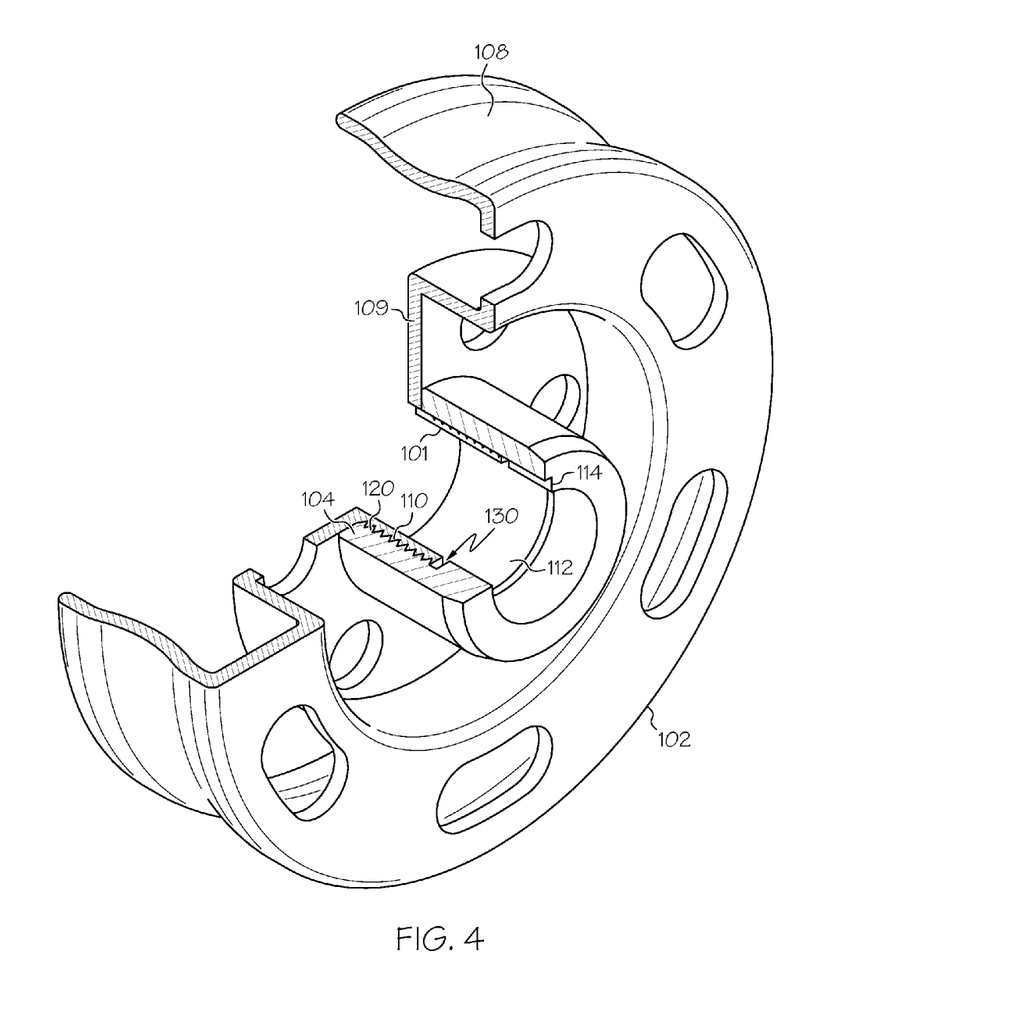
FIG. 4 is a side perspective, partial cut-away view of a completed two-part hub after a third stage of manufacture.
Figure 5:
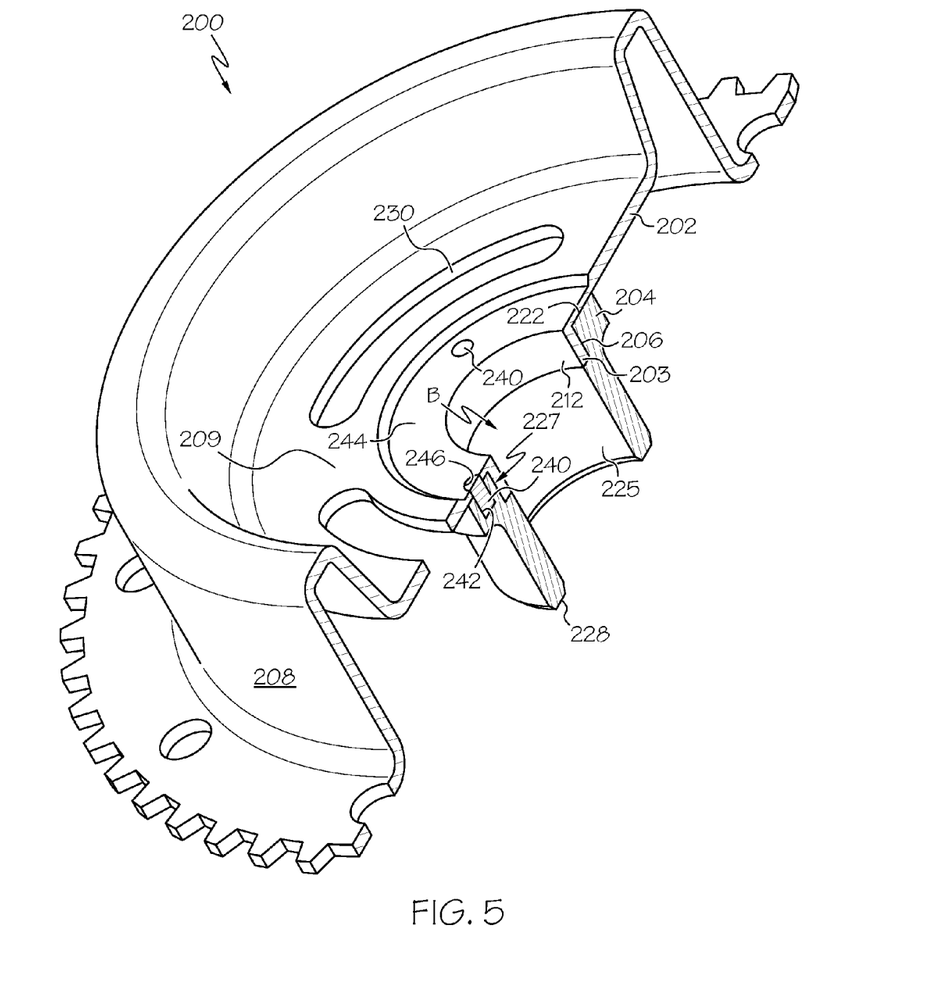
FIG. 5 is a longitudinal cross-sectional, perspective view of a second embodiment of a two-part hub for a torsional vibration damper.

The improvement to the FEAD system 18 herein is a torsional vibration damper having a two-part hub as shown in FIGS. 2-4 or in FIG. 5, which is made without welding and provides an abrasion/wear resistant seal nose 104 as a portion thereof. In the assembled view of FIG. 4, the hub 100 includes a main body 102 and a seal nose 104 threadingly mated thereto. The seal nose 104 has a front face 122, a back face 128, and threads 120 that terminate at a terminus 126 proximate a shoulder 128. The main body 102 includes a plate 109, an annular core 101 extending axially, outward from the plate 109, in particular, from a back face of the plate 109, and defining an innermost, outer radial surface 106 (FIG. 2), and an outermost radial surface 108 spaced apart from the innermost, outer radial surface 106 by the plate 109. The annular core 101 includes threads 110 as part of the innermost, outer radial surface 106 and defines a bore 112 through the hub 100 for receiving a shaft. The seal nose 104 has threads 120 threadingly mated to the threads 110 of the annular core 101.

As labeled in FIGS. 2 and 3, the plate 109 has a front face FF designated by an arrow in the figures, and an opposing face, the back face BF, as shown by the second arrow in the figures. The plate 109 may define one or more apertures 130 and/or a recesses 132. The apertures 130 may each be arcuate since these may receive a portion of an elastomeric member (not shown), which is typically an annular member. While the plate 109 is illustrated as having a recess 132, the plate 109 could instead have one or more protrusions for mating with an elastomeric member. Any one or more of the apertures 130 may be positioned to receive a fastener to hold components of the torsional vibration damper together or to reduce the amount of material needed in the hub 100 to reduce weight and/or cost. Plate 109 should not be construed as requiring a flat, one-planar construction. It may have such a construction, but it may be irregular shaped as seen in the figures. In FIGS. 2 and 3, the plate 109 portion of the main body 102 has a stair-step configuration when viewed from either the front face FF or the back face BF.

As seen in FIGS. 2-4, the nose seal 104 is a femalely-threaded component and the annular core 101 is a malely-threaded component. The threads 110, 120 thereof are threadingly mated into a fully assembled position (FIG. 4) where the seal nose 104 has its front face 122 seated in contact with the plate 109. Further, the fully assembled position has a shoulder 124 of the seal nose 104, which is proximate the terminus 126 of its threads, spaced apart from a back face 113 of the annular core 101 by a distance, thereby defining a gap 130 as shown in FIG. 4. Accordingly, the shoulder 124 is not seated against the annular core 101. This configuration provides for contact between only one face of each of the nose seal 104 and the main body 102 to provide proper axial alignment of these two components with respect to one another. The advantage of this construction is axial integrity of the joint formed by threadingly mating the components together. Moreover, once a crank-bolt secures the hub to a crankshaft, the seal nose 104 and the main body 102 cannot be axially separated from one another.

Still referring to FIG. 4, a keyway 114 is formed through the bore 112 of the annular core 101 into the threads 120 of the seal nose 104 thereby locking the threads 110 of the annular core 101 and the threads 1120 of the seal nose 104 together, which also provides axial integrity to the joint. The formation of the keyway 114 causes some of the first material, since it is a softer material than the second material, to fill any spaces between the threads 110, 120 at the site of the keyway 114 thereby locking the threads together and providing angular integrity to the joint. The keyway 114 is also beneficial to prevent angular deflection of the joint by receiving a shaft in the bore 112 that has a matching key that is received in the keyway 114.

In one embodiment, the threads 110 and/or 120 may include a coating that enhances the rigidity and/or seal of the joint. In one embodiment, Loctite® threadlocker may be used to coat the threads.

The main body 102 includes a first material that is abrasion/wear resistant. The seal nose 104 includes a second material that is different from the first material and is more abrasive resistant than the first material. Accordingly, the first material is softer than the second material. In one embodiment, the seal nose 104 includes nodular iron (grade D4512 or equivalent, also known as ductile iron). In another embodiment, the seal nose 104 includes gray cast iron (grade G3500 or equivalent). The main body 102 may include a low carbon steel. In one embodiment, the main body includes a DD13 grade low carbon steel or its equivalent. Other suitable materials for the main body include iron, steel, aluminum, other suitable metals, plastics, or a combination thereof as long as it is different, softer, and/or cheaper from the material included in the seal nose 104.

The hub 100 may be manufactured as illustrated by the sequence of FIGS. 2-4. In FIG. 3, a main body 102 comprised of a first material and having an annular core 101 defining a bore 112 therethrough for mounting the hub 100 to a shaft (not shown) and having threads 110 on a surface of the annular core 101 is provided along with a seal nose 104 having threads 120 and including a second material that is more abrasive resistant than the first material. Then, as illustrated in FIG. 4, the seal nose 104 was threadingly mated to the annular core 101 by mating the threads 110, 120. And thereafter, a keyway 114 is formed through the bore 112 into the threads 120 of the seal nose 104 thereby locking the threads 110 of the annular core 101 and the threads 120 of the seal nose 104 together. The formation of the keyway 114 causes some of the first material, since it is a softer material than the second material, to fill any spaces between the threads 110, 120 at the site of the keyway 114 thereby locking the threads together and providing angular integrity to the joint. The keyway 114 typically extends the full axial length of the bore 112.

The method for manufacturing the hub 100 may also include providing the main body 102 as described above, but without the threads as shown in FIG. 2. In this manner the main body 102 may be a stamped piece and the method may include stamping a first material into the shape of the main body 102 and thereafter forming threads 110 as shown in FIG. 3. Threads 110 may be formed on the innermost, outer radial surface 106 of the annular core 101 by tapping, machining, or other known or hereinafter developed techniques.

In other embodiments, the main body 102 may be cast, spun, forged, or molded using known or hereinafter developed techniques with or without the threads 110. Threads 110 may be formed by tapping, machining, or other known or hereinafter developed techniques.

The method of manufacturing the hub 100 may include forming the seal nose 104 by machining it from a piece of abrasion resistant material such as nodular iron or grey cast iron, including tapping or machining the threads 120 thereof.

In the method, threading the seal nose 104 to the annular core 101 includes threadingly mating the seal nose 104 to the main body 102 until the front face 122 of the seal nose 104 contacts the plate 109. The front face 122 of the seal nose 104 once in contact with the plate 109 places its shoulder 124 (FIGS. 2 and 3), which is proximate the terminus 126 of its threads 120, spaced apart from a back face 113 of the annular core 101 by a distance thereby defining gap 130 (FIG. 4).

After the seal nose 104 is threadingly mated to the annular core 101, the method may include honing the bore 112 of the annular core 101 for a press-fit to a selected shaft.

In another embodiment, the threads 110 of the annular core 101 and the threads 120 of the seal nose 104 are self-locking, thereby providing axial rigidity to the threadingly mated connection therebetween. In this embodiment, the formation of keyway 114 is not necessary and may be omitted. Without the keyway, another mechanism should be introduced to provide angular rigidity to the joint (i.e., prevent angular motion between the seal nose 104 and the main body 102). One such mechanism is a geometric lock. In one embodiment, a geometric lock includes a generally D-shaped hole defined by either the nose seal 104 or the annular core 101 of the main body 102, or both and a generally D-shaped shaft received in the generally D-shaped hole(s), which may be an independent shaft or may extend from either component. In another embodiment, the geometric lock may be a plurality of pins extending axially through the plate of the hub into the nose as illustrated and explained in more detail with respect to FIG. 5.

Figure 6:
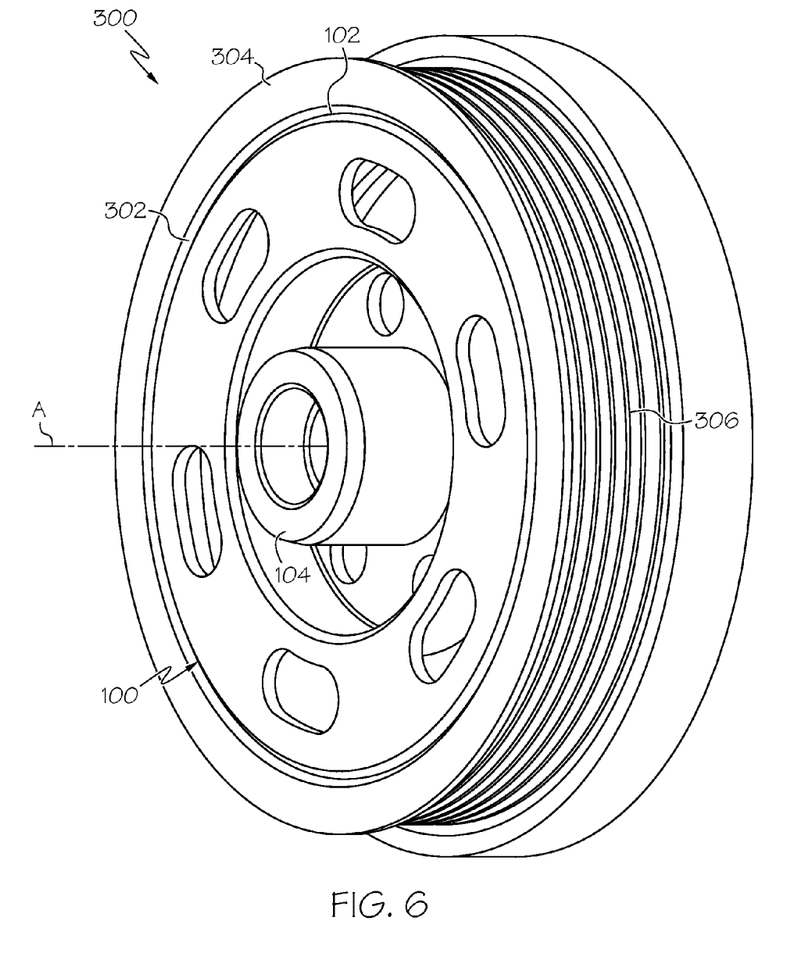
FIG. 6 is a side, perspective view of a torsional vibration damper having the two-part hub of FIG. 4.

With reference to FIG. 6, the method of manufacturing includes disposing an elastomer ring 302 circumferentially about the damper assembly-receiving surface 108 of the main body 102 to be concentric with the axis of rotation A of the hub 100 and disposing an inertia ring 304 circumferentially about the elastomer ring 302 to be concentric with the axis of rotation A to form a torsional vibration damper 300. In one embodiment, the inertia ring 304 is positioned first relative to the hub 100 and the elastomer ring 302 is press fit into a gap between the inertia ring 304 and the damper assembly-receiving surface 108 of the main body 100. The inertia ring 304 may include an outer radial belt-engaging surface 306.

Referring now to FIG. 5, a second embodiment of a two-part hub 200 is shown. The two-part hub 200 includes a main body 202 and a seal nose 204 press-fittingly mated thereto. The main body 202 include a plate 209, an annular core 203 extending from the plate 209 and defining an innermost, outer radial surface 206, and a damper assembly-receiving surface 208 spaced apart from the innermost, outer radial surface 206 by the plate 209. The annular core 203 defines a bore 212 through the hub 200. The plate 209 may define one or more apertures 230 positioned to receive a fastener to hold components of the torsional vibration damper together or to reduce the amount of material needed in the hub 100 to reduce weight and/or cost. Plate 209 should not be construed as requiring a flat, one-planar construction. It may have such a construction, but it may be irregular shaped as seen in the figures. In FIGS. 2-4 and FIG. 5, the plate 209 portion of the main body 202 has a stair-step configuration when viewed from either the front face FF or the back face BF. The front face of the plate 209 at the annular core 203 has an annular recess 244 formed therein to receive the head of a crank-bolt or a washer positioned on the crank-bolt adjacent to the head thereof. Positioned within the annular recess 244 at positions that align with the front face 222 of the seal nose 204, in particular, each aligned with a receptacle 242 in the seal nose 204, are a plurality of holes 246 extending through the plate 209.

The seal nose 204 has a front face 222, a back face 228, and an inner bore 225 shaped with at least a portion 227 thereof dimensioned to be press-fit to the innermost, outer radial surface 206 defined by the annular core 203 of the main body 202. The front face 222 of the seal nose 204 includes a plurality of receptacles 242 extending axially into the seal nose 204 that are each shaped to receive a pin 240. In one embodiment, each pin 240 is press-fit into a receptacle 242 through a hole 246 through the plate 209 of the main body 202 at a position that align with the receptacle 242 in the seal nose. The press-fit does not have to overly tight because once a crank-bolt (not shown) secures the hub 200 to a crankshaft (not shown), the head of the bolt or a washer and head of the bolt holds the pins 240 in position during operation of the FEAD system. In another embodiment, the front face 222 of the seal nose 204 includes a plurality of pins protruding axially therefrom, which are received in the holes 246 in the plate 209 when the seal nose 204 is press-fit to the annular core 204. In both embodiments, the pins 240 lock the main body 202 and seal nose 204 together without welding, but also provide axial rigidity to the hub 200 at reduced expense because the main body 202 can be made of a cheaper, even softer material by a cheaper method of manufacture than the nose seal 204, as explained above with respect to the embodiment in FIGS. 2-4. The same materials and methods of manufacture for the main body 202 and the seal nose 204 discussed above apply here. The seal nose 204 includes a second material that is different from the first material that the main body 202 is made of and is more abrasive resistant than the first material.

In one embodiment, the hub 200 may be manufactured by stamping a first material into the shape of the main body 202 with or without the holes 240. If the holes 240 are not formed in the stamping process, they are formed thereafter by any suitable method, such as drilling, etching, punching, etc. The manufacturing process further includes forming the seal nose 204 by casting it from a second material, such as a nodular iron or grey cast iron, that is more abrasion resistant than the first material. The casting may include the formation of the receptacles 242 in the front face 222 of the seal nose or a step of machining the receptacles 242 therein may be completed after the casting is complete. Once both the main body 202 and the seal nose 204 are provided, manufacturing includes press-fitting the seal nose 204 to the annular core 203 of the main body 202, inserting pins 240, one each, into a receptacle 242 in the front face 222 of the seal nose through the holes 246 in the plate 209 of the main body 202, machining the annular recess 244 into the plate 209, machining the back face of the seal nose 204 and the bore B of the hub 200 defined collectively by the bores 212, 225 of the main body 202 and seal nose 204 to meet axial and radial run-out specifications.

Also, the method of manufacturing includes disposing an elastomer ring (not shown) circumferentially about the damper assembly-receiving surface 208 of the main body 202 to be concentric with the axis of rotation of the hub 200 and disposing an inertia ring (not shown) circumferentially about the elastomer ring to be concentric with the axis of rotation to form a torsional vibration damper. In one embodiment, the inertia ring is positioned first relative to the hub and the elastomer ring is press fit into a gap between the inertia ring and a damper assembly-receiving surface 208.

Once the hub 200 is assembled per the manufacturing method discussed above, it can be mounted onto the crankshaft. In this embodiment, the hub is slip fit onto the crankshaft and no keyway and key mechanism is needed between the crankshaft and the hub to provide axial rigidity to the hub. Instead the pins 240 provide the axial rigidity, and as explained above, the crank bolt or crank bolt and washer hold the pins in place axially once the hub 200 is bolted to the crankshaft.

Although the invention is shown and described with respect to certain embodiments, it is obvious that modifications will occur to those skilled in the art upon reading and understanding the specification, and the present invention includes all such modifications.

What is claimed is:

1. A hub for a torsional vibration damper comprising: a main body comprising: a plate having a front face and a back face; an annular core extending axially outward from the back face of the plate and defining an innermost, outer radial surface of the main body and defining a first bore through the main body; and an outermost, radial, elastomer-receiving surface extending from the plate and spaced apart from the innermost outer radial surface by the plate; and a seal nose mated to the innermost, outer radial surface of the annular core receiving the main body and mechanically engaged with the main body for rotation together without a welded joint; wherein the main body comprises a first material and the seal nose comprises a second material, wherein the first material and the second material are different in that the first material is softer than the second material.

2. The hub of claim 1, wherein the seal nose has a front face seated in contact with the plate.

3. The hub of claim 2, wherein the seal nose includes a shoulder proximate but spaced a distance apart from a terminus of the annular core, thereby defining a gap between the shoulder and the terminus of the annular core.

4. The hub of claim 1, wherein the innermost, outer radial surface of the main body includes threads, and the seal nose has threads threadingly engaged the threads of the innermost, outer radial surface of the main body.

5. The hub of claim 4, wherein a keyway formed with the first bore of the annular core for mating with a key on a crankshaft broaches the threads of the seal nose, thereby locking the threads of the annular core and the seal nose together.

6. The hub of claim 1, wherein the seal nose defines a second bore, and the first bore of the annular core and the second bore of the seal nose collectively define a crankshaft-receiving bore.

7. The hub of claim 1, wherein the seal nose is press-fittingly engaged with the innermost, outer radial surface of the annular core.

8. The hub of claim 7, wherein one or more pins extend axially into a front face of the seal nose, and connect the seal nose to the main body for rotation together.

9. The hub of claim 1, wherein a geometric lock, comprising a hole defined by either or both of the seal nose or the annular core and a pin extending received in the hole, mechanically engaged the main body to the seal nose.

10. A torsional vibration damper comprising: a hub comprising: a main body comprising: a plate having a front face and a back face; an annular core extending axially outward from the back face of the plate and defining an innermost, outer radial surface and defining a first bore through the main body; and an outermost, radial, elastomer-receiving surface extending from the plate and spaced apart from the innermost outer radial surface by the plate; and a seal nose mated to the innermost, outer radial surface of the annular core receiving the main body and mechanically engaged with the main body for rotation together without a welded joint; wherein the main body comprises a first material and the seal nose comprises a second material, wherein the first material and the second material are different in that the first material is softer than the second material; an elastomeric damper member disposed in contact with the hub; and an inertia member seated against the elastomeric damper member thereby operably coupling the inertia member to the hub for rotation therewith.

11. The torsional vibration damper of claim 10, wherein the elastomeric member is an annular ring of elastomeric material seated against the outermost, radial elastomer-receiving surface of the main body of the hub, and the inertia member is an annular ring seated against the elastomeric member, both of which are concentric about an axis of rotation of the hub.

12. A front end accessory drive system comprising the torsional vibration damper of claim 10 mounted to a crankshaft for rotation therewith.

13. A hub for a torsional vibration damper comprising:
a main body comprising:
    a plate having a front face and a back face;
    an annular core extending axially outward from the back face of the plate and defining an innermost, outer radial surface and defining a first bore through the main body; and
    an outermost, radial, elastomer-receiving surface spaced apart from the innermost outer radial surface by the plate; and
a seal nose mated to the innermost, outer radial surface of the annular core and mechanically engaged with the main body for rotation together without a welded joint;
wherein the main body comprises a first material and the seal nose comprises a second material, wherein the first material and the second material are different in that the first material is softer than the second material;
wherein the innermost, outer radial surface of the main body includes threads, and the seal nose has threads threadingly engaged the threads of the innermost, outer radial surface of the main body.

14. The hub of claim 13, wherein a keyway formed with the first bore of the annular core for mating with a key on a crankshaft broaches the threads of the seal nose, thereby locking the threads of the annular core and the seal nose together.

15. A hub for a torsional vibration damper comprising:
a main body comprising:
    a plate having a front face and a back face;
    an annular core extending axially outward from the back face of the plate and defining an innermost, outer radial surface and defining a first bore through the main body; and
    an outermost, radial, elastomer-receiving surface spaced apart from the innermost outer radial surface by the plate;
a seal nose press-fittingly engaged to the innermost, outer radial surface of the annular core; and
one or more pins extending axially into a front face of the seal nose to connect the seal nose to the main body for rotation together without a welded joint;
wherein the main body comprises a first material and the seal nose comprises a second material, wherein the first material and the second material are different in that the first material is softer than the second material.

* * * * *